United States Patent [19]

Staas

[11] 4,415,706

[45] Nov. 15, 1983

[54] COMPATIBLE BLENDS OF POLYGLUTARIMIDES AND POLYAMIDES

[75] Inventor: William H. Staas, Churchville, Pa.

[73] Assignee: Rohm and Haas Company, Philadelphia, Pa.

[21] Appl. No.: 440,672

[22] Filed: Nov. 10, 1982

[51] Int. Cl.³ .............................................. C08L 77/10
[52] U.S. Cl. ...................................... 525/183; 525/181
[58] Field of Search ................................ 525/183, 181

[56] References Cited

U.S. PATENT DOCUMENTS

| 4,148,846 | 4/1979 | Owens | 525/66 |
| 4,255,322 | 3/1981 | Kopchik | 525/73 |

Primary Examiner—Theodore Morris
Assistant Examiner—Ana L. Carrillo
Attorney, Agent, or Firm—Marc S. Adler

[57] ABSTRACT

This invention relates to compatible polymer blends of from about 1 to about 99 percent by weight of an imidized acrylic polymer, containing at least 5 percent by weight glutarimide units, and from about 99 to about 1 percent by weight of a polyamide or mixtures thereof. The compatible polymer blends of polyglutarimides and polyamides possess certain desirable characteristics of each of the polymer components. Compatible polymer blends of polyglutarimides and polyamides improve the melt flow, melt strength, tensile strength, and modulus of polyamides. Compatible polymer blends of polyamides and polyglutarimides possess improved impact resistance and ductility compared with neat polyglutarimides. The addition of a high service temperature polyglutarimide to a lower service temperature nylon results in improved service temperature for the nylon. Compatible polymer blends of polyglutarimide, nylons, and conventional impact modifiers exhibit an improved response to impact modification than does the imide modified with an equal amount of the conventional impact modifier.

32 Claims, No Drawings

COMPATIBLE BLENDS OF POLYGLUTARIMIDES AND POLYAMIDES

BACKGROUND OF THE INVENTION

1. Field of the Invention

This invention relates to compatible blends of imidized acrylic polymers and polyamides and more particularly to compatible blends, of polyglutarimides and nylons, which possess desirable characteristics of each of the individual polymers.

2. Description of the Prior Art

In general, physical blending of polymers has not been a successful route for combining into a single material the desirable individual characteristics of two or more polymers. Typically, blends of polymers result in a material which combines the poorest characteristics of each polymer such that the resulting blend is not of any practical value. Thermodynamics, and particularly the entropy of mixing polymers, dictates that most polymer blends will not be miscible or compatible and will result in a material having two or more distinct phases, each containing predominantly only one of the starting polymers. Miscibility, as used herein, refers to the complete intermixing of the individual polymers in each other on a molecular level to form a solution. Compatibility, as used herein, is a more general term than miscibility but should not be confused with miscibility. Compatibility describes the ability of polymers to combine together for beneficial results. Compatible polymer blends appear macroscopically uniform, although on a molecular level the individual polymers may or may not be completely miscible in each other and may or may not form true polymer solutions.

In order to obtain combinations of polymers which exhibit the desirable characteristics of each polymer, copolymerization of the polymers or the incorporation of compatibilizers which are soluble in each of the polymers have been employed. U.S. Pat. No. 4,090,996; Mechanical Properties of Polypropylene—Low Density Polyethylene Blends, Nolley, Barlow and Paul, *Polymer Engineering and Science*, March 1980, Vol. 20, No. 5, p. 364; A Brief Review of Polymer Blend Technology, Paul and Barlow, *Multiphase Polymers*, Copper and Estes, Adv. Chemical Series 176 (1979); *Block Copolymers*, Allport and Janes, p. 365.

Polyglutarimides, including those disclosed in U.S. Pat. No. 4,246,374 to Kopchik, possess good thermal stability, high service temperatures (°C. Vicat), high tensile strength, solvent and hydrolysis resistance, good weatherability properties, low melt flow rates, and high melt strength. Polyglutarimides are, however, brittle and exhibit poor impact resistance. The impact resistance or toughness of neat polyglutarimides may be improved by the addition of conventional impact modifiers, for example, ABS (acrylonitrile/butadiene/styrene), MBS (methylmethacrylate/butadiene/styrene), all acrylic modifiers, polycarbonates, and mixtures thereof (U.S. Pat. Nos. 4,217,424 and 4,254,232). However, it has been found that conventional polycarbonate-containing impact modifier systems for polyglutarimides are not miscible or compatible with polyglutarimides and can result in anisotropy in injection molded articles prepared therefrom. This injection molding induced anisotropy is caused by the melt flow orientation of insoluble, deformable inclusions of polycarbonate in the polyglutarimide. As a result, the impact modified polyglutarimide is tougher in the direction of flow into a mold than it is in the transverse direction. This anisotropy makes injection molded articles prepared from conventionally impact modified polyglutarimides containing polycarbonate unsuitable for certain applications requiring uniform toughness.

Despite the commercial utility of poly(carbon)amides, referred to herein as polyamides, for example in the preparation of fibers, polyamides have been found to be unsuitable for most extrusion and blow molding processes because of their high melt flow rates and poor melt stength. Accordingly, attempts have been made to modify polyamides to achieve better strength characteristics by the incorporation of modifiers. U.S. Pat. Nos. 3,668,274; 3,796,771; and 3,784,497 disclose modifications to nylon 6 and nylon 66 by incorporating acrylic core//shell polymers. These polymer additives improve the impact resistance and melt flow characteristics of the nylons but lower other important performance parameters, such as tensile strenth and modulus, and result in opaque materials. Other patents relating to the modification of nylons include U.S. Pat. No. 3,963,799 (graft reaction of polyamide and ethylene-based rubber modifier); U.S. Pat. No. 4,035,438 (mixture of polycaprolactam and polyethylene and a graft polymer of ethylene/(meth) acrylic acid copolymer and grafted polymerized units of E-caprolactam); U.S. Pat. No. 4,086,295 (incorporation of a copolymer of ethylene and a carbonate or epoxy compound); U.S. Pat. No. 4,100,223 (incorporation of polyethylene and emulsifying copolymer of aromatic vinyl compound and an alpha,beta-unsaturated mono- and/or dicarboxylic acid or anhydride having free acid groups optionally neutralized by mono- and/or polyamides, ammonia, and esters of the mono- or dicarbocylic acid); U.S. Pat. No. 4,167,505 (acrylic core//shell modifier dispersed in higher molecular weight nylon followed by blending with low molecular weight nylon); U.S. Pat. No. 4,174,358 (polyamide matrix resin and branched or straight chain polymer of specified particle size range and tensile modulus); U.S. Pat. No. 4,246,371 (polyamide with copolymer of ethylene, (meth)acrylic acid and esters thereof); U.S. Pat. No. 4,293,662 (polyamide blended with oxidized polyethylene); U.S. Pat. No. 4,321,336 (polyamide blended with either aliphatic polyolefin, olefinic copolymer of aliphatic monoolefin, (meth)acrylic acid or esters thereof, copolymers of styrene, (meth)acrylic acid and esters thereof, copolymers of aliphatic dienes and acrylonitrile and high molecualr weight organic silicon compounds); U.S. Pat. No. 4,336,406 (polyamide and graft product of polybutadiene and grafted units of t-butyl acrylate and an acrylic acid ester with 1–4 carbon atoms in the alcohol moiety); and U.S. Pat. No. 4,346,194 (polyamide blend for low temperature impact strength and ductility formed by adding elastomeric olefin copolymer or ionic copolymer of alpha-olefin and alpha,beta-unsaturated carboxylic acid and a third copolymerizable monomer such as an acrylate or methacrylate). There are, however, no reported attempts to achieve improved impact resistance and ductility for polyglutarimides by blending the polyglutarimide with polyamides, or for achieving improved melt flow, service temperature, toughness, and improved clarity for polyamides by blending polyamides with polyglutarimides.

SUMMARY OF THE INVENTION

In accordance with the present invention, there is provided a compatible polymer blend of polyglutarimides and polyamides comprising from about 1 to about 99 percent by weight polyglutarimide and from about 99 to about 1 percent by weight polyamide and mixtures of polyamides.

It is an object of the present invention to provide a compatible polymer blend of polyglutarimides and polyamides such that the compatible polymer blend possesses certain desirable characteristics of each of the polymer components.

Accordingly, it is an object of the present invention to provide a compatible polymer blend of polyglutarimide and nylons wherein the compatible polymer blend possesses improved melt flow, melt strength, and modulus as compared with unmodified nylons.

It is also an object of this invention to provide a compatible polymer blend of low service temperature polyamides and higher service temperature polyglutarimides wherein the compatible polymer blend possesses improved service temperature than the low service temperature polyamide component.

It is an additional object of this invention to provide a compatible polymer blend of polyglutarimides and nylon 11 wherein the compatible poymer blend possesses improved clarity as compared with nylon 11.

It is a further object of the present invention to provide a compatible polymer blend of polyglutarimides and polyamides wherein the compatible polymer blend possesses improved impact resistance and ductility than neat polyglutarimides.

Other and further objects, features, and advantages of the present invention will appear more fully from the following detailed description.

DETAILED DESCRIPTION OF THE INVENTION

I have unexpectedly found that imidized acrylic polymers containing at least about 5 percent by weight glutarimide units, referred to herein as polyglutarimides, and polyamides form compatible polymer blends over the weight ratio of 99/1 to 1/99 polyglutarimide to polyamide, and that compatible copolymer blends containing from about 5 to about 95 percent by weight polyglutarimides and from about 95 to about 5 percent by weight polyamides possess certain desirable physical properties not possessed by the poorer performing polymer component.

The polyglutarimides which form compatible polymer blends with polyamides include, but should not be limited to, the imidized acrylic polymers disclosed in U.S. Pat. No. 4,246,374 to Kopchik. These imidized acrylic polymers are formed by the reaction between an acrylic polymer containing units derived from esters of acrylic or methacrylic acid and ammonia or primary amines. The imidized acrylic polymers containing at least about 5 percent by weight of glutarimide units of the formula

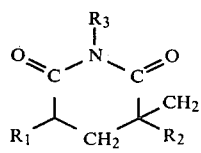

where $R_1$, $R_2$, and $R_3$, independently, represent hydrogen or unsubstituted or substituted $C_1$ to $C_2$ alkyl, aryl, or aralkyl, or mixtures thereof, are referred to herein as polyglutarimides. Polyglutarimides formed from ammonia are referred to herein as ammonia imides and polyglutarimides formed from methylamines are referred to herein as methyl imides. The Vicat softening point of polyglutarimides as determined by ASTM DI 525-70, measured in degrees Centigrade, is used herein as a prefix to identify the polyglutarimide employed, i.e. 140° methyl imide. The Vicat softening point, which is a measurement of the maximum service temperature of polyglutarimides, ranges from about 125° C. to about 220° C.

The polyglutarimides found useful in this invention contain at least about 5 percent by weight of glutarimide units and may be prepared by solution, emulsion, and autoclave processes as well as by melt reaction processes. The polyglutarimides of this invention may include other comonomers, such as styrene, in concentrations of up to and including about 95 percent by weight. The polyglutarimides of this invention are non-crosslinked, soluble in dimethylformamide and are thermally stable. The polyglutarimides may also be modified by the incorporation of additives, such as pigments, fillers, stabilizers, lubricants, and impact modifiers.

The polyamides which I have found to form compatible polymer blends with polyglutarimides include aliphatic and aromatic polyamides. The aliphatic polyamides include polylactams, for example, nylon 6, nylon 11, and nylon 12, as well as polyhexamethylene adipamide (nylon 66), and the like. The aromatic polyamides include poly(alkyl-substituted) hexamethylene diamine terephthalate having the structural formula

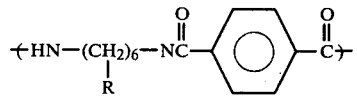

where R is an alkyl group, and the like. An example of an aromatic polyamide which is compatible with polyglutarimides is Trogamid ® T manufactured by the Kay Fries Company. Other aliphatic and aromatic polyamides and mixtures and copolymers thereof also form compatible polymer blends with polyglutarimides.

The compatible polymer blends of this invention may be formed by any conventional melt or solvent blending technique; however, melt blending is preferred. The melt blends may be prepared in any device capable of melt mixing the polymers, such as extruders, heated mill rolls, sigma and Brabender mixers, etc. If an extruder device is used to melt mix the polymers to form a compatible polymer blend, a single screw extrusion device, for example, a Killion extruder or a twin screw extruder, for example a tangentially counter-rotating twin screw extruder manufactured by the Welding Engineers Company, may be utilized.

As a preferred embodiment of this invention, I have unexpectedly found that compatible polymer blends of polyamides and polyglutarimides possess certain desirable physical properties as compared with neat polyamides. Compatible polymer blends of polyamides and polyglutarimides exhibit improved service temperature properties than low service temperature polyamides, improved modulus and strength, and improved melt flow and melt strength while preserving most of the original toughness of neat polyamides.

When a lower service temperature (DTUFL) polyamide, such as nylon 6, nylon 11, or nylon 66, is blended with at least about 10 percent by weight, and preferably at least 25 percent by weight, of a higher service temperature polyglutarimide, for example a 160° Vicat methyl imide, the service temperature of the resulting compatible polymer blend is higher than the service temperature of the corresponding neat polyamide. The service temperature of a compatible polymer blend and each of the polymer components may be determined by a distortion temperature under flexural load test (DTUFL) (ASTM 648). Generally, the DTUFL at 264 psi is about 20° to 30° C. lower than the Vicat softening temperature of polyglutarimides and is accurate to only plus or minus 5° C.

In addition to the improvement in the service temperature of the compatible polymer blends of low service temperature polyamides and higher service temperature polyglutarimides, these compatible blends, and particularly those blends containing at least 5 percent by weight and up to about 75 percent by weight nylon 11 and from about 25 percent to about 95 percent by weight methyl imide, exhibit improved clarity as compared to the corresponding neat polyamide.

In addition to improving the service temperature and clarity of low service temperature polyamides, compatible polymer blends of polyamides and polyglutarimides exhibit significantly improved modulus or rigidity as compared to neat polyamides. Neat polyglutarimides are rigid and have high moduli, while neat aliphatic polyamides are more flexible, less rigid, and have much lower moduli. By forming compatible polymer blends of polyamides and polyglutarimides, the modulus of the blend can be significantly improved over neat polyamides. This improvement in modulus as well as service temperature and clarity permits the use of compatible polymer blends of polyamides and polyglutarimides, and particularly compatible polymer blends of nylon 11 and polyglutarimides, in applications requiring clarity, toughness, and rigidity at service temperatures equivalent to, or significantly higher than, the service temperature of the neat polyamide component, depending on the ratio of imide to polyamide in the blend.

One of the most important aspects of this invention is that compatible polymer blends of polyamides and polyglutarimides exhibit significantly improved melt flow and corresponding melt strength properties than neat polyamides. It is well-known that neat nylon melts have very low viscosity and are unacceptable for use in extrusion and other forming processes to prepare strands, sheets, films, and blow molded articles. The conventional addition of large amounts of impact modifiers to nylons to improve melt strength as well as impact resistance results in products having reduced moduli and poor optical properties (opaque). The melt flow rate of neat nylon 6 at 450° F. and 400 psi is about 195 grams per 10 minutes (g/10 min.), while at 525° F. and 400 psi the melt flow rate increases to about 478 g/10 min. The melt flow rate of neat nylon 11 is even poorer than neat nylon 6, being 320 g/10 min. at 450° F. and 400 psi. The melt flow rate of nylon 66 is much lower than nylon 6 or nylon 11 and is 83 g/10 min. at 450° F.; however, this is still too rapid for effective extrusion operations. Compatible polymer blends of polyamide and at least about 5 percent by weight polyglutarimide exhibit reduced melt flow rates and correspondingly increased melt strength. These compatible polymer blends, containing up to about 50 percent by weight polyglutarimide, are acceptable for extrusion and other forming processes. As the weight ratio of the polyglutarimide to polyamide in the compatible polymer blend increases, the melt flow rate of the blend decreases and the melt strength increases. Accordingly, compatible polymer blends of polyamides and polyglutarimides can be prepared to achieve the desired melt rheology characteristics for a particular forming operation. These physical blends are simple to prepare and offer significant advantages over the addition of various modifiers, compatibilizers, and copolymers to neat polyamides.

Compatible polymer blends of polyglutarimides and mixtures or copolymers of polyamides which exhibit the desired physical properties of the individual polymer components of the blend may also be prepared. In addition, the compatible polymer blends of this invention may include other modifiers or additives, for example, fillers reinforcing agents, colors, pigments, flame retardants, processing aids, and impact modifiers, etc.

As a second preferred embodiment of this invention, I have found that the compatible polymer blends of polyglutarimides and polyamides possess certain improved phsyical properties as compared with pure or neat polyglutarimides and polyglutarimides modified with conventional impact modifiers.

Injection molded plaques of compatible polymer blends of polyglutarimides and polyamides possess improved toughness, as determined by a Gardner Vertical Height Impact Test (GVHIT), than neat polyglutarimides. The impact resistance of compatible blends of polyglutarimides and polyamides is essentially equal to polyglutarimides modified with a butadiene-based impact modifier, plus an all acrylic impact modifier, plus a polycarbonate impact modifier (U.S. Pat. No. 4,217,424, Ex. 9). However, injected molded articles formed from compatible polymer blends of polyglutarimide and nylon 11 are not subject to inclusion anisotropy or polycarbonate orientation effects as are the aforesaid conventional polycarbonate-containing impact modifed polyglutarimides. Compression molded articles of the compatible polymer blends of this invention, therefore, have the same degree of toughness as articles prepared by injection molding. Polycarbonate-containing impact modified polyglutarimides do not exhibit impact reinforcing anisotropy upon compression molding and thus exhibit less than half of the impact resistance of corresponding injection molded samples. The preferred compatible polymer blend of polyglutarimide and polyamide which exhibits improved impact resistance or toughness over neat polyglutarimides and which does not exhibit inclusion anisotropy is a compatible polymer blend containing equal proportions of methyl imide and nylon 11.

I have also found that compatible polymer blends of methyl imides and nylon 11 exhibit improved optical characteristics as compared to impact modified polyglutarimides. Conventionally impact modified polyglutarimides are opaque compositions while compatible polymer blends of methyl imide and nylon 11 are optically clear. Clarity, as used herein, refers to the ability of an observer to view objects through an article without distortion or loss of definition, i.e. glass. Transparency, as used herein, refers to the ability of an observer to view objects through an article but with some loss of definition. Translucency, as used herein, refers to the ability of an article to transmit visual light, but the light is scatterd by refraction and reflection and it is not possible to view objects through the article. Opaque, as used herein, refers to an article which does not transmit visual light therethrough. The optical properties reported herein are visually determined and the results are reported according to the above definitions. The preferred compatible imide/nylon polymer blends of this invention which exhibit clarity contain from about 5 percent to about 75 percent by weight nylon 11 and from about 95 percent to about 25 percent by weight 140° to 150° Vicat methyl imide. As the Vicat softening point of the methyl imide component of the compatible polymer blend increases to 160° Vicat and above, the compatible blend remains clear up to about 75 percent by weight nylon 11. At 80 percent by weight nylon 11 and above, the blend begins to become hazy. Hazy is a condition somewhere between true clarity and transparency. The clarity and differential scanning calorimetry data of the preferred nylon 11/methyl imide blends indicate that these polymers may be truly miscible.

It has also been found that compatible blends of 140° Vicat and 150° Vicat methyl imide and nylon 6 in a 95/5 weight ratio are also clear; however, compatible blends of higher Vicat polyglutarimides with nylon 6 and compatible blends of 140° Vicat and 150° Vicat methyl imide and greater than 5 percent nylon 6 exhibit transparency and translucency.

The improved optical properties of the preferred methyl imide/nylon blends, and particularly those blends containing from about 5 to about 50 percent by weight nylon 11, permits these blends to be useful in applications requiring optical clarity and toughness, such as in skylights, glazing, signs, containers, and films.

I have also found that compatible blends of polyglutarimides and nylons exhibit an improved response to the addition of conventional multi-stage impact modifiers than do neat polyglutarimides. For example, the incorporation of a two-stage acrylic impact modifier comprising a butylacrylate core and a polymethacrylate shell has a greater effect on notched Izod impact strength for polyglutarimide/nylon 6, 11, and aromatic nylon compatible polymer blends (50/50) than on pure polyglutarimides.

Compatible polymer blends of polyglutarimides and polyamides also exhibit improved ductility as determined by their percent elongation at break and yield as compared with neat polyglutarimides. The percent elongation at break is determined by a test conducted on an Instron tensile device (ASTM 638) using a tensile bar prepared from the material to be tested. The tensile bar is clamped at its ends in a pair of jaws of the device and the jaws are pulled apart at a uniform pre-set rate. As the tension on the tensile bar increases, the neck region of the tensile bar elongates, either stretches or yields, and eventually breaks. Yield is defined as the point at which the material begins to flow in response to stress. Yield is a function of molecular reorientation of the tensile bar in an attempt to accomodate to the tension applied. (See 1978 *Book of ASTM Standards,* Vol. 35, pp. 220-235.) Neat polyglutarimides are brittle. They typically exhibit only about a 5 percent elongation at yield. Impact modified polyglutarimides containing a butadiene-based impact modifier, an all acrylic impact modifier, and polycarbonate exhibit a maximum percent elongation at break of 18%. Polyamides, and particularly the aliphatic nylons (nylon 6 and nylon 11), are very ductile. Pure or neat nylon 6 exhibits a 190% elongation at break while neat nylon 11 exhibits a 260% elongation at break. Accordingly, it has been found that compatible polymer blends of polyglutarimides and polyamides have improved ductility as compared to neat polyglutarimides. The preferred compatible polymer blend of about 50 percent by weight polyglutarimide (140° methyl imide) and about 50 percent by weight nylon 11 exhibits a maximum percent elongation at break greater than neat polyglutarimides and about 80 percent higher than the maximum percent elongation at break for conventionally impact (polycarbonate) modified polyglutarimides. Polyglutarimide (ammonia imide) containing 5% styrene comonomer by weight blended with nylon 6 or an aromatic nylon in a 50/50 weight ratio also exhibits improved ductility as compared to neat polyglutarimides.

Compatible polymer blends of low service temperature polyglutarimides and nylon 6 and nylon 66 exhibit an improved Vicat softening temperature than the corresponding neat polyglutarimide when the nylon is present in the blend at concentrations of about 50 percent or higher. Increasing the Vicat temperature is desirable as it permits a thermoplastic to be useful for applications which require exposure to high temperatures.

The following examples in which the percentages are by weight are presented to illustrate a few non-limiting embodiments of the invention.

GENERAL PREPARATION AND TESTING METHODS

All the polyglutarimides used in the following examples were prepared according to the teachings of U.S. Pat. No. 4,246,374. The polyamides used herein are nylon 6, manufactured by the Foster Grant Company, American Hoechst and BASF, nylon 11, manufactured by Rilsan Company, nylon 66, manufactured by E. I. duPont De Nemours under the mark Zytel ®, and an aromatic polyamide, Trogamid ® T, manufactured by the Kay Fries Company.

EXAMPLES 1-17

Melt Rheology and Service Temperature Improvement of Compatible Polyamide/Polyglutarimide Blends 140° Vicat N-methyl and unsubstituted (ammonia) glutarimide polymers were prepared according to the teaching of U.S. Pat. No. 4,246,374. These glutarimide polymers were separately melt blended with nylon 6, nylon 66, and nylon 11 in a 0.8 inch Welding Engineer twin screw extruder at 525° F. (barrel/die). The melt blends formed were compatible and exhibited improved melt flow rate over the corresponding neat polyamide. The blends also exhibited Vicat softening temperature at least equivalent to or better than the corresponding neat polyglutarimide. All the compatible polymer blends showed excellent hot strength (melt strength) while neat nylon 6, nylon 11, and nylon 66 showed poor hot strength under identical extrusion conditions and were impossible to strand and pelletize. The melt rheology and service temperature improvement of compatible polyamide/polyglutarimide blends are illustrated in Table 1.

Since the melt flow rate of polyglutarimide is at least an order of magnitude slower than the melt flow rate of neat aliphatic nylons (Example 17 versus Examples 1, 14, and 15), compatible polymer blends of aliphatic nylons and at least about 5 percent by weight polyglutarimide exhibit a significantly reduced melt flow rate and a correspondingly increased melt strength compared to the neat aliphatic nylon, as illustrated in Examples 15 and 16.

The Vicat softening point of polyglutarimides can be improved by incorporating aliphatic nylons in a compatible polymer blend of polyglutarimide and nylon. As illustrated by Examples 1-17, as the concentration of the imide is reduced below 80 percent by weight, the Vicat softening point of the compatible polymer blend becomes higher than the neat imide. All compatible polymer blends of polyglutarimide and aliphatic and aromatic nylons containing less than about 75 percent by weight polyglutarimide and more than about 25 percent by weight nylon exhibit a Vicat softening point greater than the Vicat softening point of the corresponding neat imide.

TABLE I

| Example No. | Imide Type | Amide Type | Blend Ratio Imide/Amide | Vicat °C. | Melt Flow Rate (g/10 min.) 450° F. 400 psi | Melt Flow Rate (g/10 min.) 525° F. 400 psi |
|---|---|---|---|---|---|---|
| 1* | — | Nylon 6 | 0/100 | — | 195.0 | 478 |
| 2 | 140° Ammonia | Nylon 6 | 20/80 | >200 | 8.5 | — |
| 3 | 140° Ammonia | Nylon 6 | 50/50 | 172 | 2.3 | — |
| 4 | 140° Ammonia | Nylon 6 | 80/20 | 135 | 4.8 | — |
| 5 | 140° Methyl | Nylon 6 | 20/80 | 199 | 9.1 | — |
| 6 | 140° Methyl | Nylon 6 | 50/50 | 152 | 3.9 | — |
| 7 | 140° Methyl | Nylon 6 | 80/20 | 135 | 10.0 | — |
| 8 | 140° Methyl | Nylon 66 | 20/80 | >200 | — | 9.0 |
| 9 | 140° Methyl | Nylon 66 | 50/50 | 217 | — | 7.5 |
| 10 | 140° Methyl | Nylon 66 | 80/20 | 137 | 2.1 | 34.0 |
| 11 | 140° Ammonia | Nylon 66 | 20/80 | >200 | — | 12.0 |
| 12 | 140° Ammonia | Nylon 66 | 50/50 | 173 | — | 7.2 |
| 13 | 140° Ammonia | Nylon 66 | 80/20 | 135 | 2.0 | 42.0 |
| 14* | — | Nylon 66 | 0/100 | — | — | 83.0 |
| 15* | — | Nylon 11 | 0/100 | — | 320.0 | — |
| 16 | 140° Methyl | Nylon 11 | 5/95 | — | 14.0 | — |
| 17* | 140° Methyl | — | 100/0 | 140 | 8.2 | — |

*Comparative

EXAMPLES 18-35

An 18 inch Welding Engineer screw extruder was employed to prepare a series of methyl imide/nylon 6 and methyl imide/nylon 11 compatible polymer blends at 470° to 525° F. The blends were injection molded using an ASTM cluster mold in a Newbury injection molder. The molding conditions were 475° F. barrel/nozzle, 60-70 RPM screw speed, 25 second injection time, and 55 second cycle time. The DTUFL, impact properties, ductility, modulus, and optical appearance of these blends were evaluated and the results are presented in Table II.

TABLE II

| Example No. | Imide Type[1] | Nylon Type | Blend Imide/Nylon | DTUFL °C. 264 psi | Izod ft/lb | GVHIT in/lb | % Elongation at Break | Modulus psi | Optical Appearance |
|---|---|---|---|---|---|---|---|---|---|
| 18 | 140° | 6 | 5/95 | 52.0 | 16 | >340 | 52 | 306,000 | Translucent |
| 19 | " | " | 50/50 | 99.5 | 8.5 | >300 | 66 | 545,000 | Transparent |
| 20 | " | " | 95/5 | 112.5 | 6.0 | — | 38 | 568,000 | Clear |
| 21 | 140° | 11 | 50/50 | 67.5 | NB[2] | >340 | 129 | 162,000 | Clear |
| 22 | " | " | 95/5 | 108.5 | 6.0 | — | 27 | 526,000 | Clear |
| 23 | 150° | 6 | 50/50 | 100.5 | 17 | — | 57 | 412,000 | Translucent |
| 24 | " | " | 95/5 | 114.5 | 7.0 | — | 51 | 558,000 | Clear |
| 25 | 150° | 11 | 50/50 | 73.0 | NB[2] | >340 | 90 | 157,000 | Clear |
| 26 | " | " | 95/5 | 111.5 | 7.0 | — | 30 | 551,000 | Clear |
| 27 | 160° | 6 | 25/75 | 63.0 | NB[2] | — | 30 | 562,000 | Translucent |
| 28 | " | " | 50/50 | 101.0 | 12.4 | — | 80 | 396,000 | Translucent |
| 29 | " | " | 75/25 | 130.0 | 11.5 | — | 30 | 562,000 | Transparent |
| 30 | 160° | 11 | 25/75 | 49.0 | NB[2] | >340 | — | — | Clear, Hazy |
| 31 | " | " | 50/50 | 73.0 | NB[2] | >340 | — | — | Clear |
| 32 | " | " | 75/25 | 106.0 | 8.0 | — | 54 | 456,800 | Clear |
| 33* | — | 6 | 0/100 | 54.0 | NB[2] | >300 | 190 | 125,000 | Translucent |
| 34* | — | 11 | 0/100 | 38.0 | NB[2] | >340 | 260 | 12,000 | Transparent |
| 35* | 160° | — | 100/0 | 130 | 7.5 | 4 | 40 | 600,000 | Clear |

[1] Imide Type is methyl.
[2] NB = No Break
*Comparative

These examples illustrate that compatible polymer blends of polyglutarimides and nylons exhibit improvement in service temperature of low service temperature nylons (DTUFL); improvement in impact resistance of polyglutarimides; improvement in ductility of polyglutarimides, improvements in modulus of nylons; and improvement in optical appearance of neat nylons. All the compatible polymer blends exhibited a service temperature (DTUFL) equivalent to or greater than the service temperature of the corresponding neat aliphatic nylon. This service temperature improvement is the result of the higher DTUFL of the polyglutarimide as compared with the DTUFL of the neat nylons (compare Examples 33-35). The improvement in DTUFL service temperature of aliphatic nylons also occurs with nylon 66.

The impact resistance of polyglutarimides also is improved by forming compatible polymer blends of aliphatic nylons and polyglutarimides. This improvement occurs with compatible polymer blends containing more than 5 percent by weight nylon.

All the compatible polymer blends exhibited a significantly improved modulus as compared to neat nylons. This improvement in modulus is achieved by incorporating at least about 5 percent by weight polyglutarimide (methyl) with any aliphatic or aromatic nylon having a modulus lower than the modulus of the corresponding neat polyglutarimide.

Compatible polymer blends containing from at least about 5 percent by weight to about 75 percent by weight nylon 11 and methyl imides, having a Vicat service temperature of 140° C. and higher, are optically clear.

The 50/50 blend of 140° Vicat methyl imide and nylon 11 (Example 21) was analyzed by Differential Scanning Calorimetry (DSC) and showed a single amorphous phase having a glass transition temperature (Tg) of 65° C. This Tg is intermediate between the Tg of the methyl imide (138° C.) and the nylon 11 (38° C.) and indicates that this blend has a truly miscible amorphous phase. The 50/50 blend of 150° Vicat methyl imide and nylon 11 showed similar solubility with a single Tg at 96° C. The compatible blends of Example 20 (95 methyl imide/5 nylon 11) were molded into plaques which were optically clear with no visible haze. The plaques did not change appearance upon repeated heating and cooling in a 120° C. oven. This behavior is true of all 95/5 methyl imide/nylon blends where the Vicat softening point of the methyl/imide ranges from about 140° C. to about 180° C.

EXAMPLE 36

A melt blend of equal amounts by weight of nylon 6 and nylon 11 was opaque and flexible. 25 parts of this mixture was blended with 75 parts of a 140° methyl imide. A compression molded plaque of the resultant composition was hazy-clear and rigid.

EXAMPLES 37–45

A 192° ammonia imide containing 5 percent by weight styrene comonomer was melt blended with nylon 6, nylon 11, nylon 66, and with alkyl-substituted aromatic nylon, Trogamid ® T, in a 1" Killion extruder.

Examples 37–41 and Table III illustrate the improvement in the ductility of the compatible polymer blend as compared with the neat imide.

Examples 42–45 illustrate that compatible blends of polyglutarimides and nylon 6, 11, and alkyl-substituted aromatic nylon show improved response to impact modification when a conventional impact modifier is incorporated into the compatible blend. The compatible melt blends of Examples 37, 38, and 39 were impact modified by extrusion melt blending 2 parts of the compatible blends with one part of an all acrylic impact modifier having a butyl acrylate core and a polymethylmethacrylate outer shell. The resulting pellets were injection molded into standard ASTM test specimens and tested. The results are illustrated in Table IV.

TABLE III

| Example No. | Imide Type[1] | Nylon Type | Blend Imide/Nylon | % Elongation at Break | % Yield |
|---|---|---|---|---|---|
| 37 | 192° | 6 | 50/50 | 60 | 7 |
| 38 | 192° | TAT[2] | 50/50 | 30 | 10 |
| 39 | 192° | 66 | 50/50 | 55 | — |
| 40 | 192° | 11 | 50/50 | 140 | — |

TABLE III-continued

| Example No. | Imide Type[1] | Nylon Type | Blend Imide/Nylon | % Elongation at Break | % Yield |
|---|---|---|---|---|---|
| 41 | 192° | — | 100/0 | 4 | 0 |

[1]Imide Type is ammonia
[2]TAT = Trogamid ® T

TABLE IV

| Example No. | Imide Type[1] | Nylon Type | Impact Modifier | Blend Imide/Nylon/Modif. | Notched Izod ft-lb/in notch |
|---|---|---|---|---|---|
| 42 | 192° | 6 | all acrylic | 1/1/1 | 1.5 |
| 43 | 192° | TAT[2] | all acrylic | 1/1/1 | 1.2 |
| 44 | 192° | 11 | all acrylic | 1/1/1 | 2.0 |
| 45 | 192° | — | all acrylic | 2/0/1 | 0.5 |

[1]Imide Type is ammonia
[2]TAT = Trogamid ® T

EXAMPLE 46

Isotropy in Imide/Nylon Blends

The impact resistance (GVHIT) and directional dependance of impact resistance were evaluated using injection molded and compression molded plaques. Sample A was prepared according to Example 54 of U.S. Pat. No. 4,246,374 and comprised a blend of 65 percent polyglutarimide and 35 percent MBS impact modifier. Sample B was prepared according to Example 9 of U.S. Pat. No. 4,217,424 and comprised 50 percent polyglutarimide modified with 17.5 percent of butadiene-based multiple stage polymer, 17.5 percent of an all acrylic impact modifier, and 15 percent polycarbonate. The butadiene-based multiple stage polymer had a first stage which is a copolymer of butadiene and styrene, a second stage of styrene, and a final stage copolymer of methyl methacrylate, acrylonitrile, and styrene. The butadiene multiple stage polymer had the following composition:

butadiene/styrene//styrene/acrylonitrile/methyl/methylacrylate
73.63/ 3.87// 14.84// 3.83 /3.83

Sample C was prepared according to Example 1 (Blend A) of U.S. Pat. No. 4,254,232. Sample C comprised 39% polyglutarimide, 41% multiple stage polymer, and 20% polycarbonate. The multiple stage polymer was an MBS multiple stage polymer having a butadiene-based first stage comprising 75% of the multiple stage polymer.

Sample D was a compatible blend of polyglutarimide and nylon 11 in a 50/50 ratio.

All the samples were injection molded to provide ASTM test plaques for GVHIT tests. The blends were also compression molded to establish the physical effects of polymeric inclusion anisotropy obtained during injection molding. The results are shown in Table V. They establish that the polycarbonate containing samples (B and C) exhibited a significant reduction in impact resistance when compression molded (isotropic dispersion of polycarbonate) as compared to when they are injection molded (flow induced anisotropic dispersion of polycarbonate).

The compatible polymer blend of polyglutarimide and nylon 11 (Sample D) exhibited the same impact resistance when compression molded and injection molded, thereby establishing the absence of isotropy.

The impact resistance of the injection molded sample D of this invention was substantially equivalent to or greater than the impact resistance of the injection molded samples of the conventionally impact modified polyglutarimide, while the compression molded sample D of this invention exhibited superior impact resistance compared to compression molded conventionally impact modified polyglutarimides.

TABLE V

| Sample | GVHIT (in-lb) Injection Molded | GVHIT (in-lb) Compression Molded |
|---|---|---|
| A | 20 | 20 |
| B | 300 | 120 |
| C | 120 | 50 |
| D | >260 | >260 |

What is claimed is:

1. A compatible polymer blend comprising from about 1 to about 99 percent by weight of an imidized acrylic polymer, containing at least 5 percent by weight glutarimide units, and from about 99 to about 1 percent by weight of a polyamide or mixtures of polyamides.

2. The compatible copolymer blend of claim 1 where said imidized acrylic polymer is methyl imide or ammonia imide.

3. The compatible polymer blend of claim 1 where said polyamide is selected from the group consisting of aliphatic and aromatic nylons.

4. The compatible polymer blend of claim 3 where the aliphatic nylons are nylon 6, nylon 11, nylon 12, and nylon 66.

5. The compatible polymer blend of claim 3 where the aromatic nylon is an alkyl-substituted hexamethylene diamine terephthalate polymer.

6. A compatible polymer blend comprising from about 5 to about 95 percent by weight polyglutarimide and from about 95 to about 5 percent aliphatic or aromatic nylons and mixtures or copolymers thereof, said compatible polymer blend being uniform and possessing improved physical properties compared with the corresponding neat polyglutarimides and neat aliphatic and aromatic nylons and mixtures thereof.

7. The compatible polymer blend of claim 6 where said polyglutarimide is methyl imide or ammonia imide, said aliphatic nylon is nylon 6, nylon 11, nylon 12, and nylon 66, and where said aromatic nylon is an alkyl-substituted hexamethylene diamine terephthalate polymer.

8. The compatible polymer blend of claim 6 comprising at least 5 percent by weight polyglutarimide, said polyglutarimide being a methyl imide, and up to about 95 percent by weight aliphatic nylon, and said polymer blend having a modulus greater than the modulus of the corresponding neat aliphatic nylon.

9. The compatible polymer blend of claim 8 where said aliphatic nylon is nylon 6.

10. The compatible polymer blend of claim 8 where said aliphatic nylon is nylon 11.

11. The compatible polymer blend of claim 6 where said nylon is an aliphatic nylon and where said blend exhibits a slower melt flow rate and greater melt strength than the melt flow rate and melt strength of the corresponding neat aliphatic nylon.

12. The compatible polymer blend of claim 11 where said aliphatic nylon is nylon 11.

13. The compatible polymer blend of claim 11 where said aliphatic nylon is nylon 6 or nylon 66.

14. The compatible polymer blend of claim 13 where said aliphatic nylon comprises from about 20 to about 80 percent by weight of said compatible polymer blend.

15. The compatible polymer blend of claim 1 where said nylon is an aliphatic nylon comprising from about 25 to about 80 percent by weight of said compatible polymer blend and where said compatible polymer blend exhibits a higher Vicat softening temperature than the Vicat softening temperature of the corresponding neat polyglutarimide.

16. The compatible polymer blend of claim 15 where said aliphatic nylon is nylon 6 or nylon 66.

17. The compatible polymer blend of claim 6 where said nylon is a low service temperature aliphatic nylon selected from the group consisting of nylon 6, nylon 11, and nylon 66, said polyglutarimide having a higher service temperature than said aliphatic nylon, and where said blend exhibits improved service temperature than the corresponding low service temperature nylon.

18. The compatible polymer blend of claim 6 where said blend exhibits improved ductility as compared to the corresponding neat polyglutarimide.

19. The compatible polymer blend of claim 6 where said blend exhibits an improved impact resistance as compared to the corresponding neat polyglutarimide.

20. The compatible polymer blend of claim 18 where said aliphatic or aromatic nylon is an aliphatic nylon selected from the group consisting of nylon 6 and nylon 11.

21. The compatible polymer blend of claim 19 where said aliphatic or aromatic nylon is an aliphatic nylon selected from the group consisting of nylon 6 and nylon 11.

22. The compatible polymer blend of claim 6 where said polyglutarimide is a methyl imide having a Vicat service temperature of 140° C. to 150° C. and where said aliphatic or aromatic nylon is nylon 11, said blend comprising from about 5 to about 75 percent by weight of nylon 11 and where said blend is clear.

23. The compatible polymer blend of claim 6 where said polyglutarimide is a 160° Vicat methyl imide and said aliphatic or aromatic nylon is nylon 11, said blend comprising from about 5 to about 50 percent by weight of nylon 11 and from about 95 to about 50 percent of said methyl imide and where said blend is clear.

24. The compatible polymer blend of claim 6 where said polyglutarimide is a methyl imide having a Vicat service temperature of 140° C. to 180° C. and where said aliphatic or aromatic nylon is nylon 6 or nylon 11, said blend comprising 5 percent by weight of said nylon and 95 percent by weight of said methyl imide, and where said blend is clear.

25. The compatible polymer blend of claim 6 where said polyglutarimide is a methyl imide having a Vicat service temperature of 140° C. to 180° C. and where said nylon is nylon 6, said blend comprising from about 25 to about 50 percent by weight nylon 6 and from about 75 to about 50 percent by weight methyl imide, said blend having an optical appearance at least as good as said corresponding neat nylon.

26. The compatible polymer blend of claim 6 where said polyglutarimide is a 192° Vicat ammonia imide and where said nylon is selected from the group consisting of nylon 6, nylon 11, nylon 66, and an alkyl-substituted hexamethylene diamine terphthalate polymer, said blend comprising 50 percent by weight of said imide and 50 percent by weight of said nylon and where the said blend exhibits improved ductility as compared to the corresponding neat imide.

27. A compatible polymer blend of an ammonia imide, and aliphatic or aromatic nylon and a two- or three-stage, core/shell, impact modifier polymer in equal weight ratios whereby the compatible blend exhibits an improved response to impact modification than the corresponding imide modified with an equal amount of said all acrylic impact modifier polymer.

28. The compatible polymer blend of claim 27 where said two- or three-stage, core/shell, impact modifier polymer is an all acrylic modifier plolymer.

29. The compatible polymer blend of claim 27 where said aliphatic nylon is nylon 6 or nylon 11.

30. The compatible polymer blend of claim 27 where said aromatic nylon is an alkyl-substituted hexamethylene diamine therephthalate polymer.

31. A compatible polymer blend of polyglutarimide and nylon 11 in equal weight ratios where the impact resistance of said blend is free from orientation effects of inclusion polymer domains upon formation of injection molded or compression molded samples therefrom.

32. The compatible polymer blend according to claim 1 wherein an impact modifier is present.

* * * * *

Notice of Adverse Decision in Interference

In Interference No. 101,348, involving Patent No. 4,415,706, W. H. Staas, COMPATIBLE BLENDS OF POLYGLUTARIMIDES AND POLYAMIDES, final judgment adverse to the patentee was rendered Mar. 19, 1987, as to claims 1 - 21, 26 and 32.

[*Official Gazette February 14, 1989.*]